United States Patent
Bar-Gadda

(10) Patent No.: US 6,351,339 B1
(45) Date of Patent: *Feb. 26, 2002

(54) MULTI-DIMENSIONALLY ORIENTED MAGNETIC FIELD INFORMATION STORAGE SYSTEM

(75) Inventor: Ronny Bar-Gadda, Palo Alto, CA (US)

(73) Assignee: Ronni Corporation, Saratoga, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,856

(22) Filed: May 11, 1998

(51) Int. Cl.$^7$ .............................. G11B 5/02; G11B 5/82; G11B 5/265; G11B 5/66; B32B 3/02
(52) U.S. Cl. ........................ 360/55; 360/121; 360/135; 428/65.3; 428/694 TR
(58) Field of Search ......................... 360/55, 121, 135; 428/173, 65.3, 694 TR

(56) References Cited

U.S. PATENT DOCUMENTS

| | | | |
|---|---|---|---|
| 3,710,352 A | * | 1/1973 | Smith et al. ............. 340/173.2 |
| 4,393,110 A | | 7/1983 | Fukuda |
| 4,893,299 A | | 1/1990 | Humberstone et al. |
| 4,931,338 A | | 6/1990 | Toffle |
| 4,939,614 A | | 7/1990 | Shirakura et al. |
| 4,985,306 A | | 1/1991 | Morizane et al. |
| 4,985,885 A | | 1/1991 | Ohta et al. |
| 4,996,622 A | | 2/1991 | Takatsuki et al. |
| 5,452,165 A | * | 9/1995 | Chen et al. ................. 360/121 |
| 5,766,718 A | * | 6/1998 | Matsuda et al. ............ 360/135 |

* cited by examiner

Primary Examiner—W. Chris Kim
Assistant Examiner—Regina Y. Neal
(74) Attorney, Agent, or Firm—Burns Doane Swecker and Mathis LLP

(57) ABSTRACT

A disk medium includes a substrate and a designed topography of individually magnetizable features formed on the surface of the substrate. At least a portion of the disk topography is formed from an etched layer of magnetizable material deposited on the surface of the substrate. An information storing and retrieving system records information on the disk medium magnetically and reads the recorded information optically or magnetically. The information stored in the disk is of the form of bits each represented by a magnetic field established in the features. The direction of the magnetic field can be in a direction other than the bitstream direction, with the magnetic storing and retrieving system having a pair of non-parallel heads adapted to recognize this direction as representative of discrete logic levels formulating the basis of a non-binary storage system having significantly increased storage density.

22 Claims, 9 Drawing Sheets

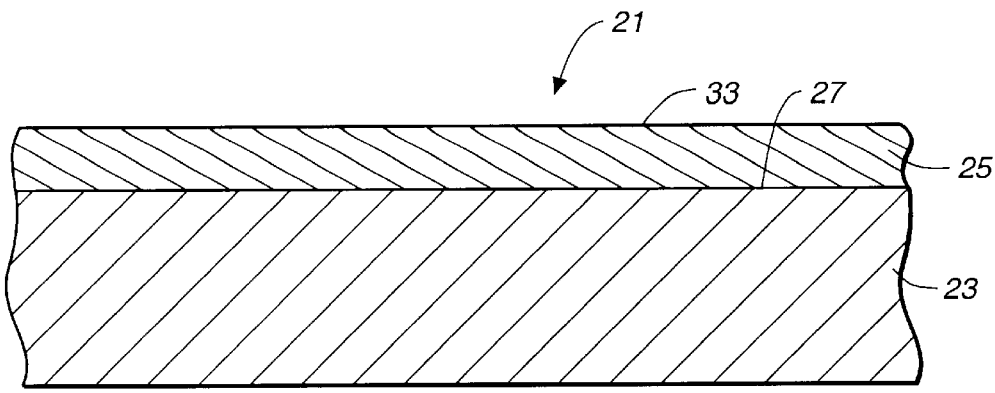
FIG._1A
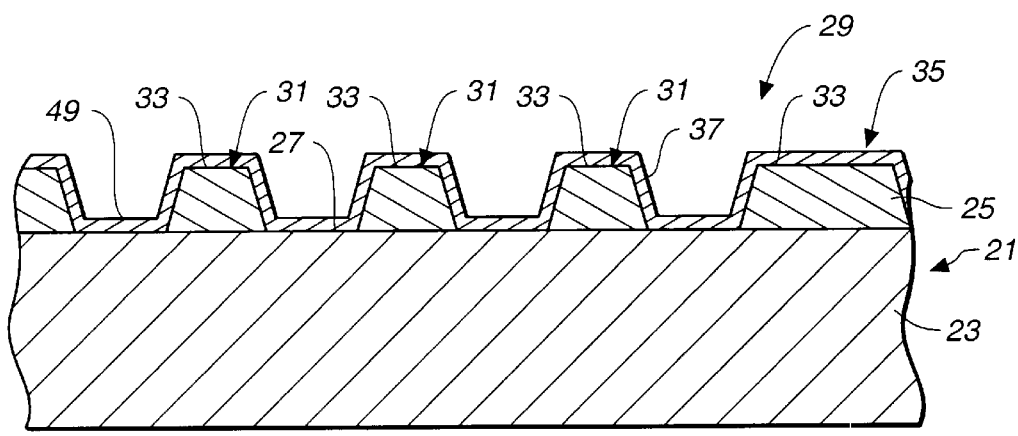
FIG._1B
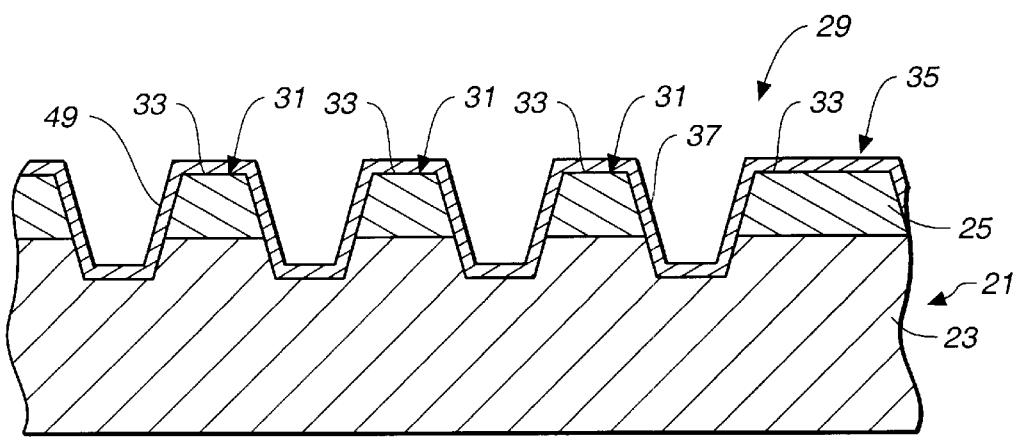
FIG._1C

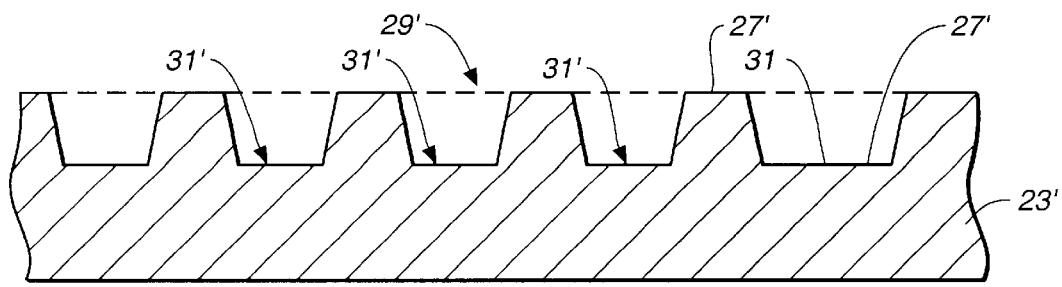
FIG._2A
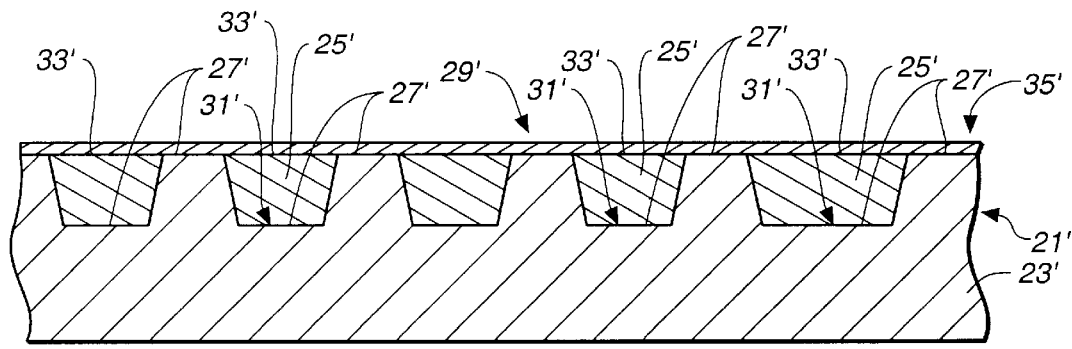
FIG._2B
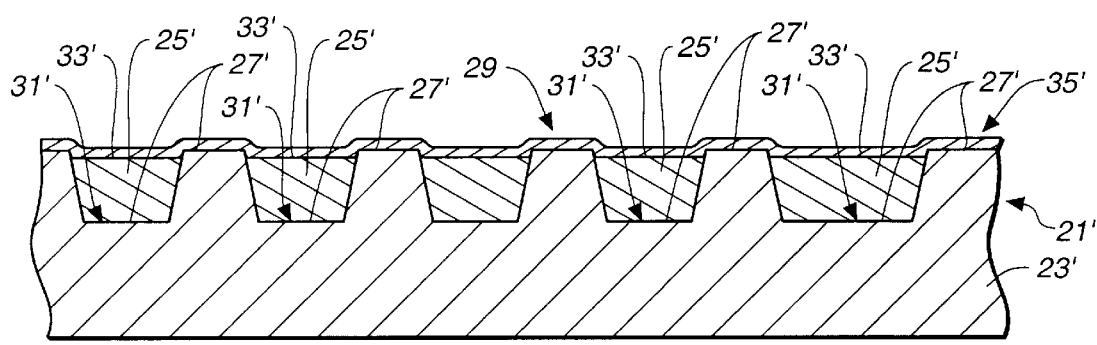
FIG._2C
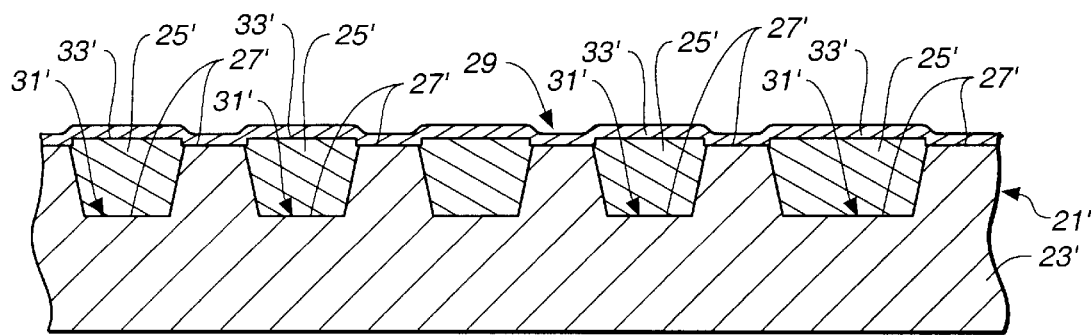
FIG._2D

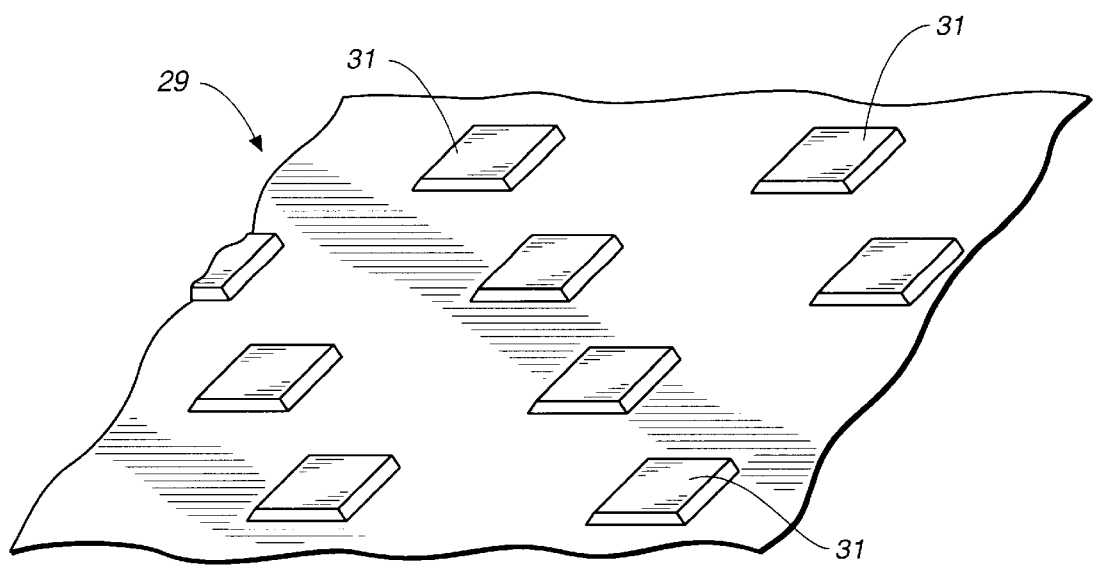
FIG._3
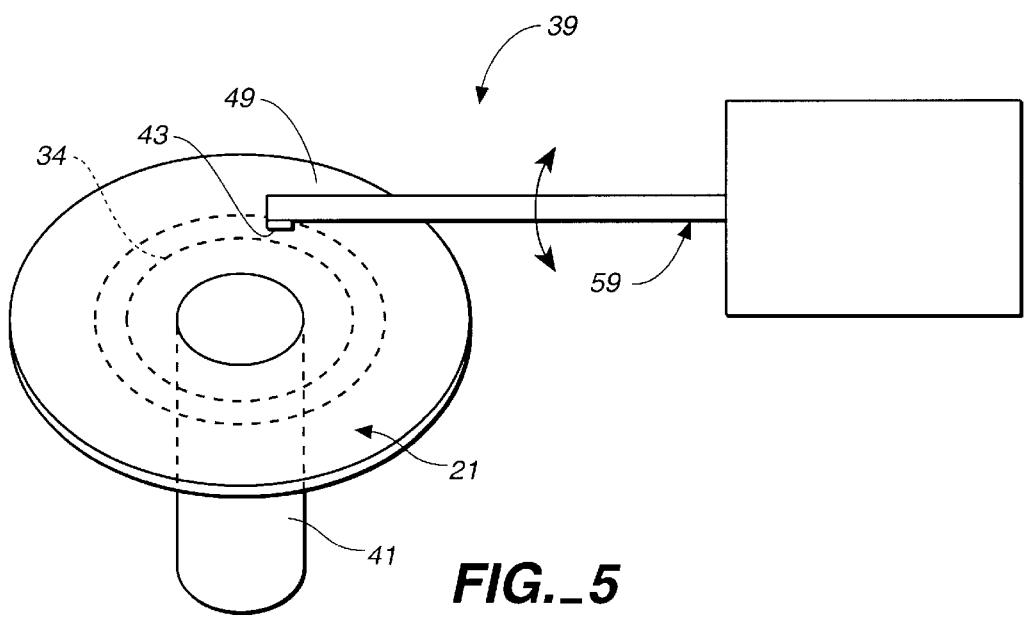
FIG._5

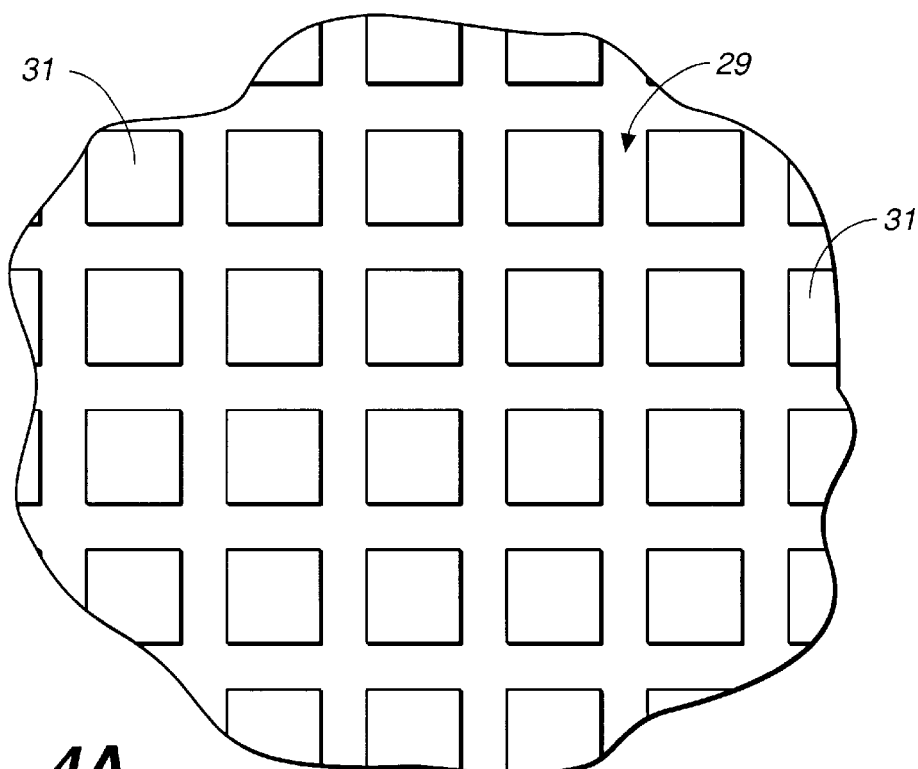
FIG._4A
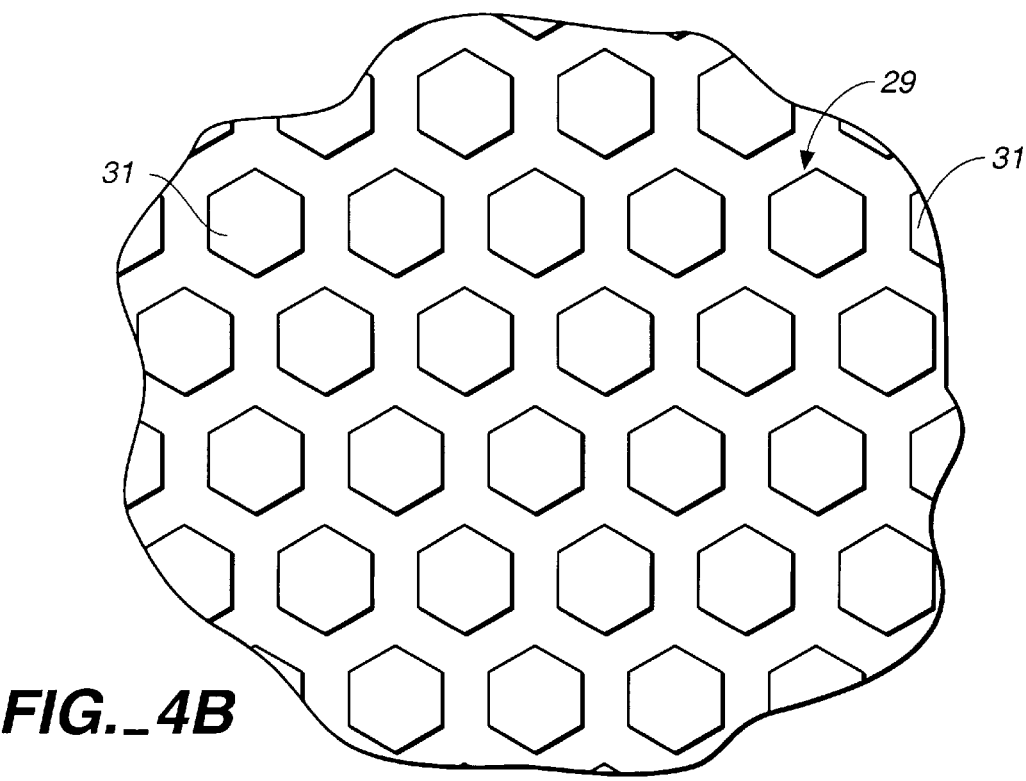
FIG._4B

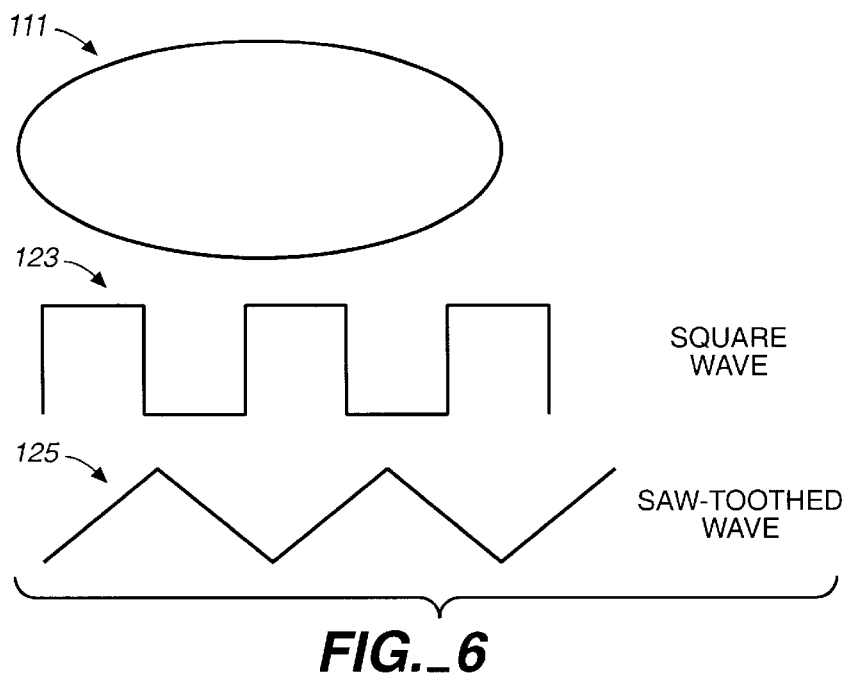
FIG._6
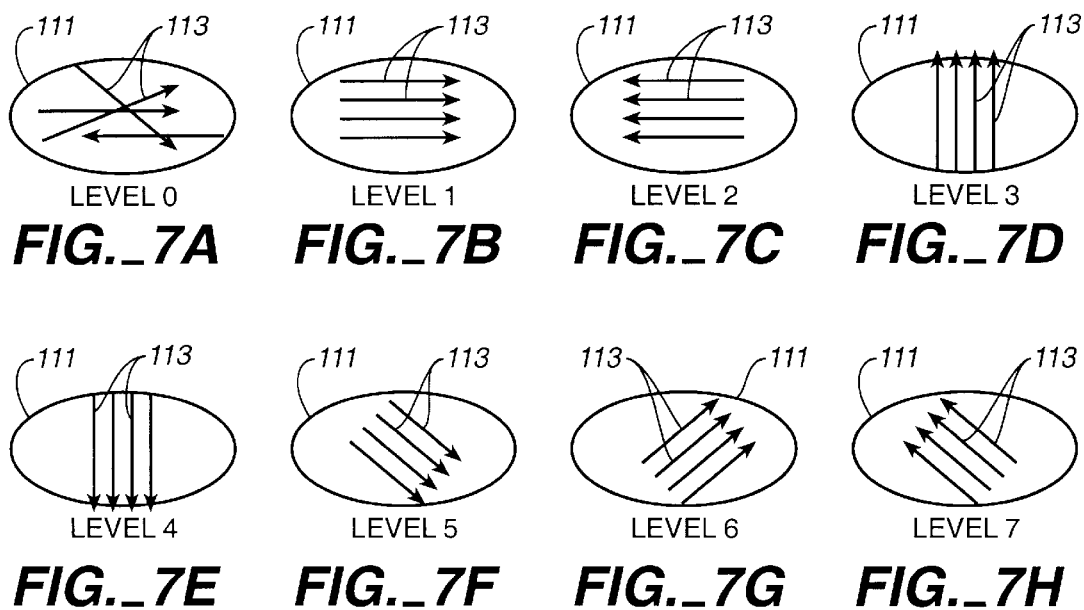
FIG._7A  FIG._7B  FIG._7C  FIG._7D
FIG._7E  FIG._7F  FIG._7G  FIG._7H

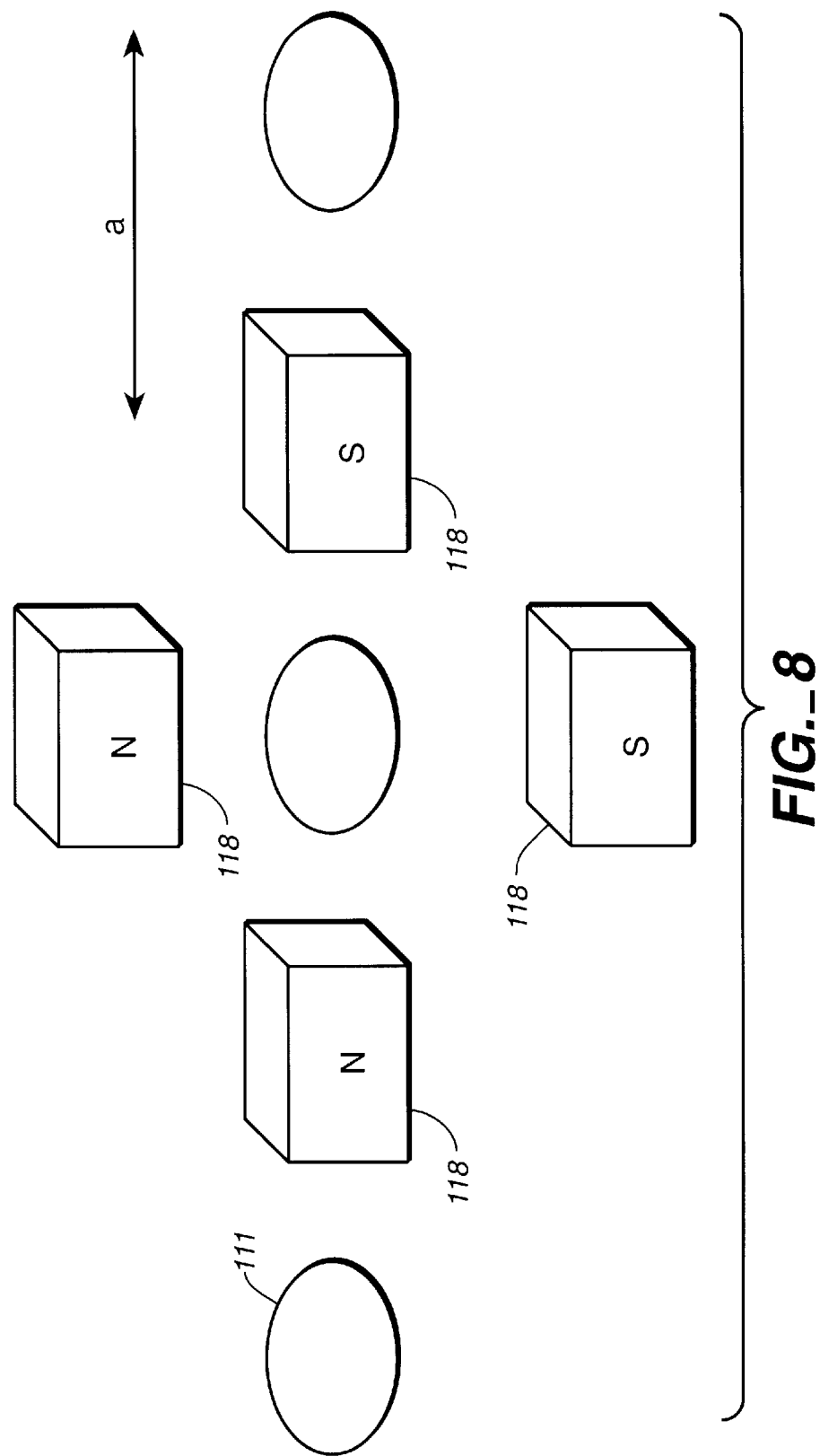

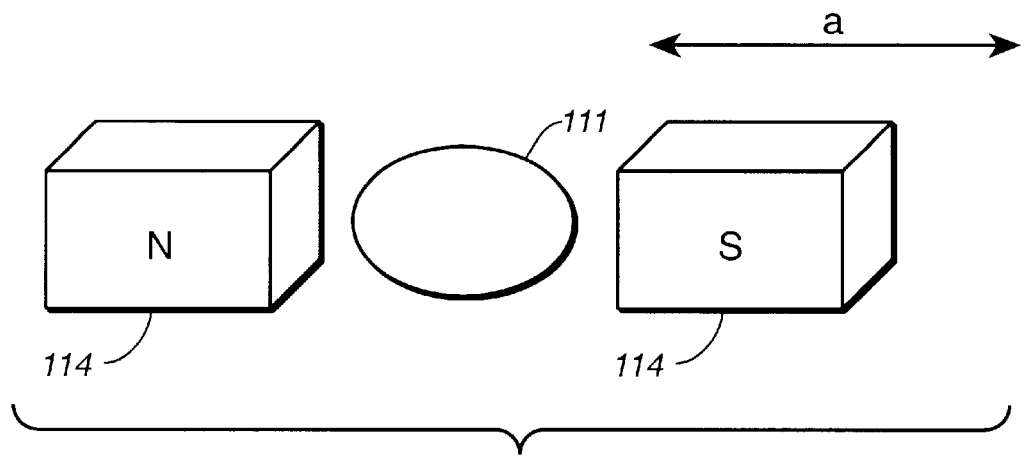
FIG._9A
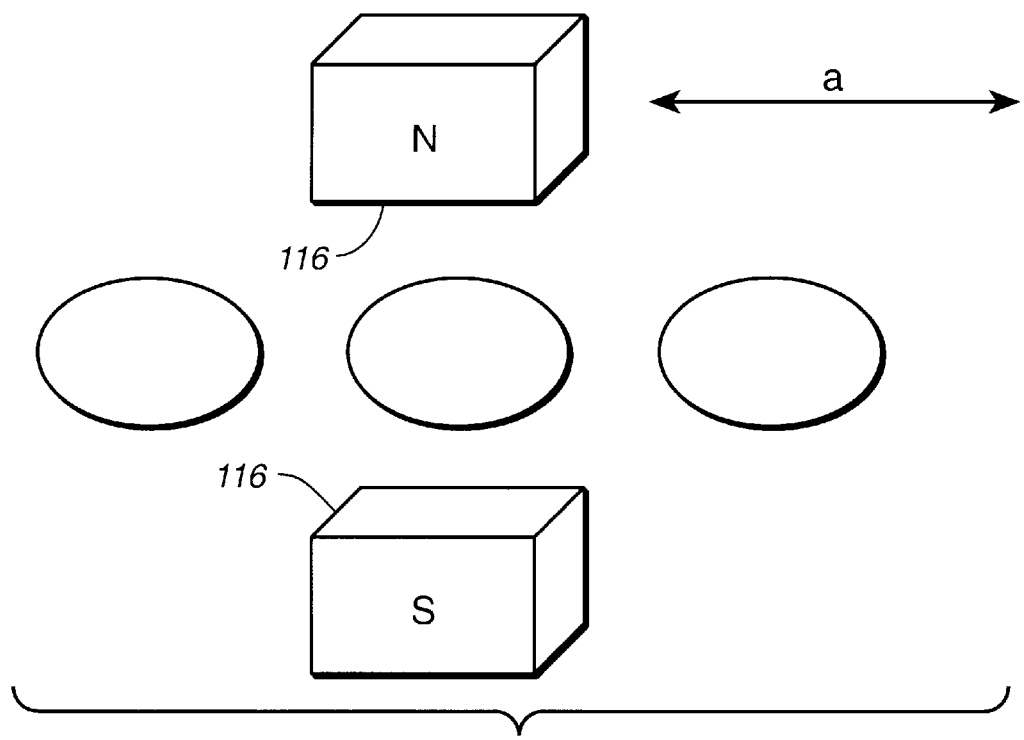
FIG._9B

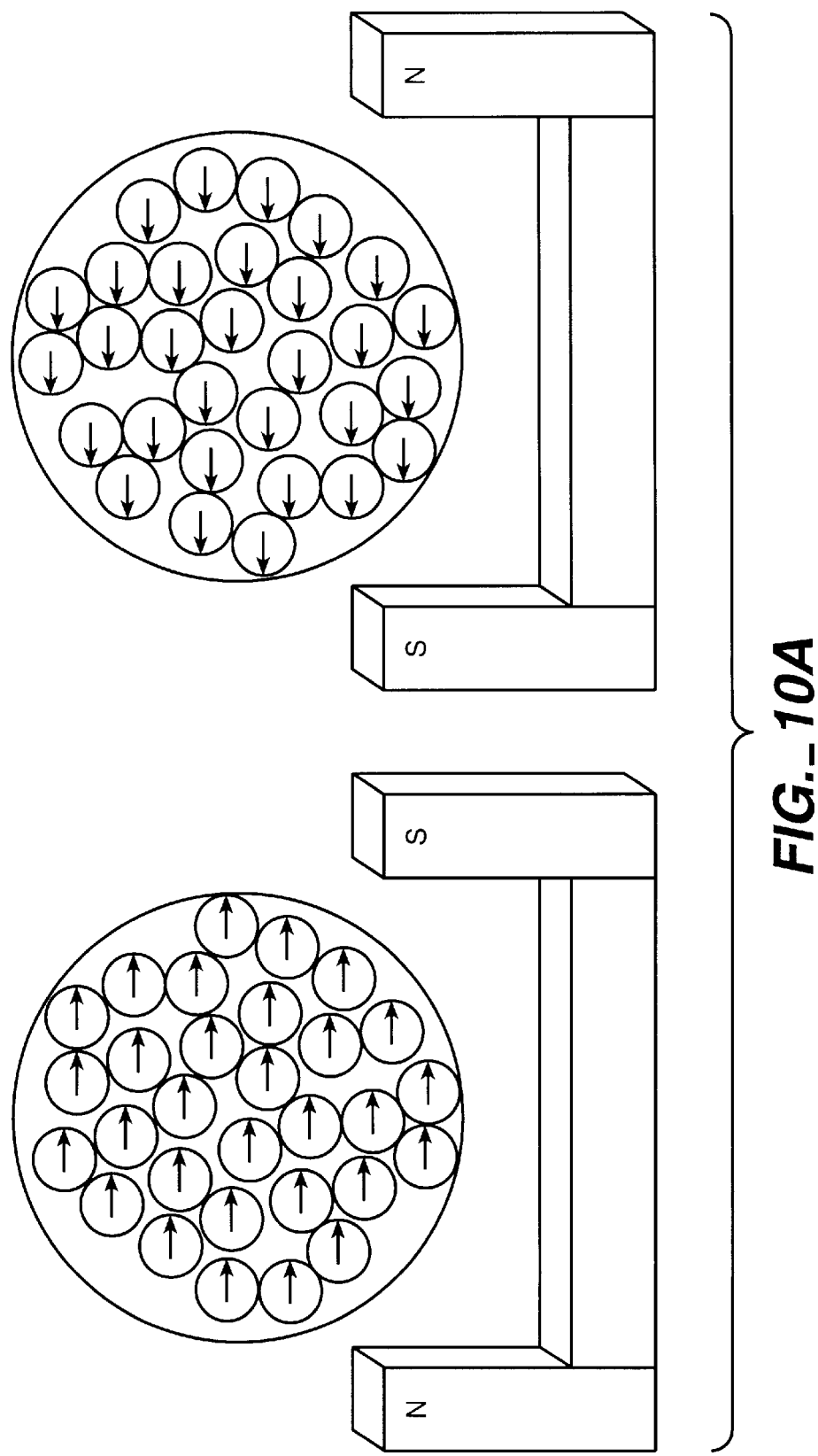
FIG._10A

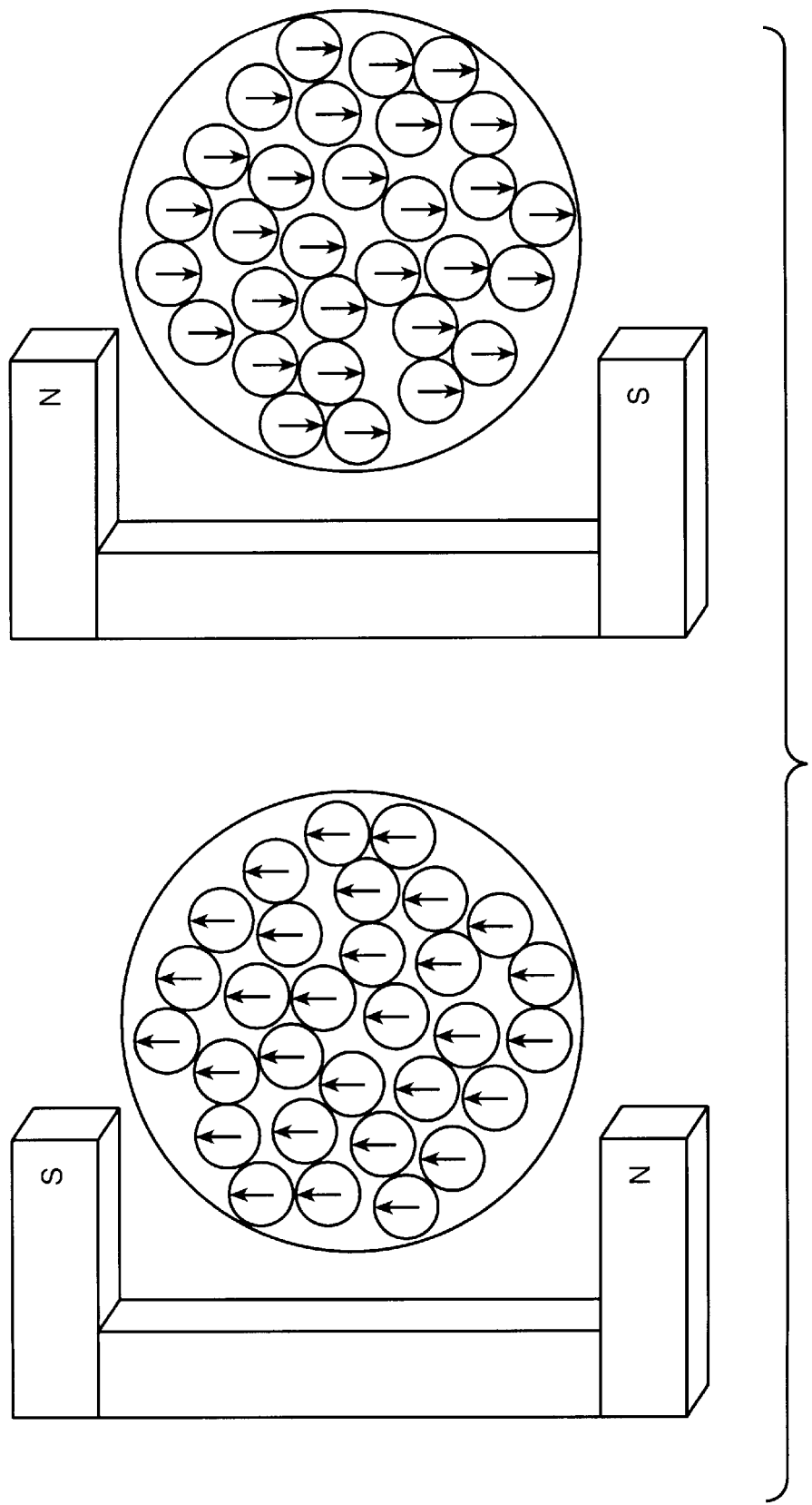
FIG._10B

MULTI-DIMENSIONALLY ORIENTED MAGNETIC FIELD INFORMATION STORAGE SYSTEM

BACKGROUND OF THE INVENTION

1. Field of the Invention

The invention relates to information storage systems, and more particularly, to magnetic information storage systems.

2. Description of Related Art

Conventional magnetic storage devices are generally of the continuous magnetization type, wherein units of information, representing information bits, take on the form of successive discrete magnetic fields each having an orientation which is either in alignment or in opposition to the next field in the succession. A read head passing over these fields detects a voltage peak when encountering a pair of successive bits having opposite orientations due to the repulsive forces between the fields. By contrast, absence of a peak at an expected boundary between fields indicates identical orientation of the successive fields. More specifically when successive bits both have either a North-South orientation on the one hand, or a South-North orientation on the other, then no voltage peak is sensed by the reading head, indicating a first logic state. Conversely, when successive bits respectively have South-North followed by North-South orientations on the one hand, or North-South followed by South-North orientations on the other, the read head detects a voltage peak and registers this as a second logic state. In this manner, two bit states can be identified and a binary information storage system implemented.

Directionally, the alignment of the bits in conventional continuous magnetization storage devices is in parallelism with the bitstream direction. That is, the magnetic fields of the bits are aligned in the direction of relative travel between the reading (or writing) head and the storage medium, with each field being either in the North-South direction or in the South-North direction. In this sense, information storage in conventional devices is one-dimensional, with the single dimension extending in the bitstream direction.

The one-dimensional limitation of the prior art is in part imposed by the continuous nature of the storage medium. By disposing the magnetic fields contiguously with each other, interactions between the fields preclude practical implementations of field alignment in directions other than along the bitstream direction. Hence, only two bit states, as described above, are possible.

In any magnetic recording medium, there must be some minimal spacing between adjacent magnetic domains or else it will be impossible to separately write and read the magnetic state of an individual magnetic domain because of interference from adjacent, abutting, or overlapping domains. Crosstalk and mutual magnetization occurs in which information is lost, rendering a magnetized domain useless. The magnetized domain becomes machine unreadable. Ordered data in the form of a series of sequential, magnetized holes is impossible.

U.S. Pat. No. 4,393,110 discloses that holes are formed in a non-magnetic substrate by electron beams or by laser beams. The holes are subsequently filled with magnetic material. The holes have diameters between 200 A and 5000 A. Holes that are larger or smaller than this range of diameters are not suitable for the disclosed magnetic recording medium. There are between $1.6 \times 10^7$ and $1.6 \times 10^{11}$ holes/cm$^2$. Greater or lesser densities are not suitable for the disclosed magnetic recording medium. The magnetic recording medium has a (linear) recording density of 100 KBPI (kilobits per inch).

Electron beam systems involve the movement of an electron gun or the movement of a mechanical stage. Variations that arise in the fabrication of holes using an electron beam system include: 1) variation of the stage movement and placement of the substrate and system mechanical components; 2) variations in the nature of the beam; and 3) variations in the process of hole creation in the sense of limits imposed by physics and chemistry.

Known reading/writing heads for magnetic recording media are only capable of reading/writing information when the information is in specific locations on the magnetic recording medium. In a typical reading/writing arrangement, a head is held in position over a rotating magnetic recording medium and magnetizes or detects the magnetic state of particular magnetic domains (i.e., areas of magnetized material corresponding to a single bit of information) of the magnetic medium moving relative to the head. The head is also often movable, such as by being movable radially outwardly and inwardly over the disk. Successive magnetic domains represent ordered data. If, when a disk is moved relative to a head, no magnetizable material, or insufficient magnetizable material, is disposed beneath the head, or if magnetizable material is not disposed sufficiently close to the head, the head cannot read or write on the disk. Information storage is impossible with the non-symmetrical domains because the distance of the head from the non-symmetrical domains permits only some of the domains to be written on so that information stored in the domains is machine readable. Unless all of the successive magnetic domains are capable of being written on and read, information storage is impossible.

Because of the particular physical arrangement of the Fukuda system, that system essentially discloses a magnetic recording medium of the type having a substantially continuous layer of magnetic material in the form of numerous holes filled with magnetic material, and wherein bits of information are stored by magnetizing successive, spaced groups of the filled holes. For this type of magnetic recording medium, typically, a head detects a magnetic state within an area on the surface of a disk medium because, within the area, there is likely to be a group of the small, filled holes that can be magnetized and detected. Given the limits of electron beam technology and the disclosure of Fukuda, Fukuda does not disclose a magnetic recording medium where each hole filled with magnetic material corresponds to one bit of information because such a magnetic recording medium would have overlapping or interfering magnetic domains.

In disk media having numerous randomly located holes filled with magnetic material, the holes are sufficiently numerous and close together such that, although the filled holes are discontinuous, the overall effect of the holes is to simulate continuous magnetic material. A head vertically or horizontally magnetizes (i.e., writes) and/or detects the magnetic state of transitions (i.e., reads) between radially and/or concentric groups of the filled holes. In vertical recording media, a magnetic head device magnetizes successive, contiguous magnetic regions of recording medium at right angles to the surface of the medium, i.e., an axis between N-S poles of a magnetized region extend perpendicularly to the surface of the medium. In horizontal recording media, transitions in a magnetically recorded waveform follow each other on a tape or disk with N-S and S-N transitions recorded end to end. In both vertical and horizontal recording media, a transition in polarity between successive regions of the recording medium represents a bit of information. For example, a N-N or S-S transition might correspond to a "1" and a N-S transition might correspond to a "0", or vice versa. Known writing and/or reading technology requires that at least one of the head and the disk be moved such that the head passes over the specific radial and concentric areas of the disk to read successive bits of previously written information.

Existing writing and/or reading technology is incapable of detecting the magnetic state of individual ones of randomly located filled holes, since there is no ordered succession in radial or concentric directions of the filled holes. No known reading and/or writing head is configured to identify the location of each successive filled hole or to magnetize or detect the magnetic state of the magnetizable material filled in the holes for such disks. Moreover, the individual filled holes are ordinarily so small and densely packed relative to one another that existing heads are too insensitive to magnetize or detect the magnetic state of individual ones of the holes.

In known disk media having continuous magnetic surfaces (often actually a layer of magnetic material beneath other layers closer to the actual surface of the disk) or magnetic surfaces defined by numerous randomly located holes filled with magnetic material, recording density is limited since adjacent continuous or effectively continuous magnetic regions interfere with each other. In horizontal recording media, so-called "Neel spikes" tend to form between adjacent north and south poles, thus reducing the energy stored. At high packing densities, the transitions occasionally touch one another and bridges may develop into separate islands.

It is preferred that the length of the particle-like magnets defining the information stored on conventional disk media be several times greater than their thickness to minimize self-demagnetization due to neutralization of adjacent poles of the magnets by one another. Particularly at high packing densities, there is an increased likelihood of such demagnetization.

Recording of data in disk drives is done by writing at a level that simultaneously erases old data. This erasure is nowhere near perfect, and a residual signal from old data is common. The ratio of the new signal to the old signal is called "overwrite". It is roughly proportional to the write level of the new signal. In conventional technology, edges of tracks are not perfectly overwritten due to spindle runout and insufficient write-wide-read-narrow margin, the new signal tends to be modulated by the old signal, and the new recorded track may have equal signal strength to the old track leading to bit error.

U.S. Pat. No. 4,893,299 appears to suggest etching a surface of a substrate 1 to provide a surface texture consisting of, e.g., two series of alternating grooves and ridges, the series preferably being at right angles to one another to form a "crossed grating". Col. 6, lines 37–51. A thin film 2 of magneto-optic material is deposited on the surface. As shown in FIGS. 5a, 5c, 6a–6b, 6d–6e, 7a–7b, 7d, and 8, the film of magneto-optic material 11 may be discontinuous. The embodiments shown in FIGS. 6d, 7a–7b, and 7d show magneto-optic material 11 disposed only on crests of sinusoidal or tops of square-wave profile ridges, which may be parts of a crossed grating arrangement of ridges.

U.S. Pat. No. 4,985,885 appears to suggest an optical memory device A including a plurality of strip-shaped magneto-optic recording layers 2 which can be formed, by etching, Col. 6, lines 17–33, into concentric circles or spirals, or dots on virtual concentric circles or spirals. Col. 4, lines 13–18. Information is stored on the recording layers with laser light and stored information is read with laser light.

Another concern with magnetic storage media involves the physical interaction between the read/write head and the storage medium itself. Magnetic disk drive assemblies as used for mass data storage in computers and electronic systems today comprise either rigid ("hard") disk drives or flexible ("floppy") drives. Both types of drives incorporate low cost data storage capacity with rapid recovery of stored data. This rapid availability of stored data is a function of the rotational speed of the disk relative to the read/write transducer as well as the proximity of the transducer to the magnetic medium. In practice, a read/write transducer is mounted in a head assembly that accurately follows the surface of a disk at flying heights of less than 1 micron. In particular, the head suspension assemblies are designed to prevent contact between the read/write head and the magnetic recording medium during operation; such contact, called head crash, can destroy a read/write head and the magnetic medium in a short time due to the friction that results from the high rotational speed of the disk relative to the head. Although current technology provides lubrication and protective layers on the disk, these measures are generally intended to compensate only for transient friction events during stop/start cycles.

In general, control of the texture characteristics of the disk surface is required to reduce the substantial attractive forces that are generated between the read/write head and the stationary disk surface. Smoother disk surface textures result in higher attractive forces that prevent proper head liftoff and flying characteristics when disk rotation is commenced. Current disk manufacturing techniques must also assure that the disk surface roughness does not exceed certain upper-bound values; if excessive surface roughness results from the texturing process, undesirable increases in flying height also limit the density with which data can be stored on the disk. A central issue in current disk texturing processes is the reliability and consistency with which the desired surface roughness is obtained. The disk surface texture is typically characterized in terms of an arithmetic average roughness value ($R_a$). Current disk texturing processes generally produce $R_a$ values in the range of 10–200 nm; the most modern disk drives achieve head flying heights of 0.2–0.3 microns with $R_a$ values of approximately 10–50 nm. These texturing processes utilize special abrasives for producing circumferential patterns of scratches on the surface of metallic (predominantly aluminum) disk substrates which inevitably create surface feature extremes in the form of peaks and valleys. U.S. Pat. Nos. 4,996,622, 4,939,614 and 4,931,338 describe variations of this general process. Several of these patents propose different textures for separate areas of the disk optimized for stop/start operations and for read/write operations. These patents document the difficulty of obtaining low flying heights (i.e., less than 0.3 microns) while simultaneously achieving acceptably low head/disk attractive forces with current disk texturing processes.

Other texturing processes combine abrasive texturing processes with chemical processes. For example, U.S. Pat. No. 4,985,306 describes a recording disk produced by subjecting a base plate containing $S_1O_2$—$Li_2O$—$Al_2O_3$ series crystallized glass to crystallizing treatment, polishing the surface of the base plate to attain a surface roughness of 15 Å to 50 Å to evenly distribute, regularly and two-dimensionally, very fine and uniform crystal grains in the amorphous layer. The base plate is then etched with an etchant having different degrees of dissolution with respect to the crystal grains and the amorphous layer to form uniform and regular convexities and concavities on the surface of the base plate. A magnetic film and a protective layer are applied over the base plate. Because the system described in this patent relies on an abrasive texturing process for distributing crystal grains, there is an inevitable randomness to the ultimate distribution of concavities and convexities.

The trend toward smaller diameter disks has also presented difficulties for prior-art manufacturing techniques. It has become progressively more difficult to achieve the required consistency in $R_a$ values and in disk flatness with decreasing disk diameter using conventional methods. Disk flatness variations cause axial runout of the read/write head during disk rotation. In current disk drives it is desirable to maintain this axial runout value at less than 1–2 microns. Conventional abrasive texturing techniques applied to current metallic disk substrates are becoming less viable as disk diameters are progressing downwards.

SUMMARY OF THE INVENTION

The invention overcomes deficiencies of the prior art by providing a magnetization format in which the orientations of the magnetic fields on the storage medium are not restricted to parallelism with the bitstream direction, but rather can extend in any direction in three-dimensional space. Using more than two possible machine readable orientations and assigning to each orientation a unique logic level achieves an information storage system whose numerical base is other than two—that is, instead of a binary system, any base system can be realized so long as the read head is able to distinguish between the different orientations encountered.

A design of the read head in accordance with the invention comprises a pair of non-parallel, and preferably orthogonal heads which may be of the conventional inductive or magnetoresistive types. So configured, the heads, collectively referred to as a dual-axis read/write head and singularly referred to as uni-axis component read/write heads, are able to detect or write any orientation of a magnetic field lying on the storage medium in a plane parallel to that in which they lie. In effect, the magnetic fields, each disposed in a discrete domain separated from other such domains by a non-magnetizable separation material, operate as rotating magnets whose orientation is sensed by the dual-axis read/write head and correlated to a particular logic state of the storage system. The numerical base of the system is determined by the number of possible orientations of this "magnet." Moreover, an additional logic state can be provided by using a non-magnetized state of the domain.

One advantage of departure from the conventional binary format storage is increased storage density. Whereas in a binary system a byte of information, which comprises 8 bits, can store up to 256 ($2^8$) characters, in a base three system, for example, a byte can store 6,561 ($3^8$) characters, and in a base 10 system a byte can store 100,000,000 ($10^8$) characters.

To achieve the desired characteristics of the storage medium, such as an appropriate separation between the discrete domains, the materials of the medium are selected such that the domains, which are themselves magnetizable, are non-continuous and separated by a non-magnetizable separation material. Each domain is individually addressable and represents one bit of information. The domains, correlated physically on the storage medium as features, can take the form of discrete islands or of holes formed in the disk medium. Manufacture of such a storage medium, which is disclosed in co-pending U.S. patent application Ser. No. 08/159,552 now U.S. Pat. No. 5,768,075, to Bar-Gadda and assigned to the same assignee, and which is incorporated herein by reference in its entirety, may rely on etching or other semiconductor device manufacturing processes.

The discrete nature of each domain further enables an information storage and retrieval format in which the net magnetization of each domain is used to indicate a particular logic level. This represents a significant departure from conventional systems, which rely on magnetic state transitions between successive bits to code information, rather than coding the information based on the net magnetic state of each bit individually, irrespective of the state of other bits, as performed in the present invention.

Also in accordance with an embodiment of the invention, each domain is used to store a varying magnetic field having a particular waveform. Different waveforms, such as a square waves, sawtooth waves, etc., are each assigned a logic state to implement an information storage and retrieval system. DC and/or AC biasing are optionally imparted to the stored waveforms to improve signal-to-noise ratio. Additionally, the system can operate in the frequency domains, relying on for example LaPlace or other transforms to simplify information handling.

The present invention provides a disk medium that is formed, by the processes generally associated with the shaping of layers in semiconductor chip products, to have great capacity to store information. A pattern of designed, individually magnetizable features is formed on a substrate, the features corresponding to individual bits of information. The features are physically separated from one another by non-magnetic material, thereby minimizing certain problems associated with magnetic information storage systems. Particularly, the effects of crosstalk between adjacent magnetic bits are minimized, such as the need to maintain head flying heights as low as possible in order to magnetically read and write on a disk on which large quantities of information can be stored is reduced and the need to use high coercivity magnetic materials for forming the magnetizable features in order to store large amounts of information on the disk is reduced.

The present invention further provides a disk medium that, in one embodiment, contacts a magnetic head with a low coefficient of friction, provides smooth and stable travel performance in conjunction with a magnetic head for prolonged periods of time, has improved wear resistance in use and stability in storage environments, and is capable of consistent reproduction. In practice, a magnetic disk medium according to the present invention optimizes operational conditions in a system for reading information stored on the magnetic disk medium. Surface roughness characteristics of the magnetic disk medium are controlled by the processes generally associated with the shaping of layers in semiconductor chip products. These processes permit formation of disks having an average surface roughness that creates particular aerodynamic effects when the disk is rotated at particular speeds, the aerodynamic effects being useful for suspending a magnetic head at a desired flying height above the surface of the disk during read/write operations. The same processes permit control of surface characteristics relating to friction effects between the disk surface and a magnetic head during start-up and stopping of rotation of the disk. Information storage density characteristics of the magnetic disk medium may be raised to substantially whatever density is capable of being written on or read by a magnetic head of a magnetic disk assembly, the limits on the readable density being primarily those associated with conventional apparatus operational conditions, many of which, such as magnetic head flying height, are controllable through optimization of surface roughness characteristics of the magnetic disk medium of the present invention. Further, the magnetic disk medium is readable by fixed head assemblies.

The magnetic disk medium according to an embodiment of the present invention is textured without relying on known abrasive techniques. The texturing is controlled, and is therefore less susceptible to random variations of known texturing methods. There is, consequently, a consistently reproduced disk manufactured with the above method. Because the flying height of a magnetic head can be set at a known, lower height than in systems using disks manufactured by known methods, and because transient friction events can be minimized, the disk produced by a method according to the present invention is capable of storing information with a greater density than in known disks.

In accordance with one aspect of the present invention, a method for handling information is described. In the method, a designed topography is etched in a disk. Individually magnetizable features are formed on the disk, the features corresponding to the designed topography. Information is stored on the disk by selectively changing a magnetic state of individual ones of the features.

In accordance with another aspect of the present invention, a disk medium comprises an etched, designed topography in a disk, and individually magnetizable features formed on the disk and corresponding to the designed topography.

In accordance with another aspect of the present invention, a memory system includes a disk medium including an etched, designed topography in a disk and individually magnetizable features formed on the disk and corresponding to the designed topography. Means are provided for magnetizing individual ones of the features and means are provided for detecting the magnetic state of the features.

In accordance with yet another aspect of the present invention, a method for making a disk medium includes the steps of etching a designed topography in a disk and forming individually magnetizable features on the disk, the features corresponding to the designed topography.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 1A is a cross-sectional schematic view of a portion of an unetched disk according to an embodiment of the present invention, and FIGS. 1B and 1C are cross-sectional schematic views of the portion of a disk according to FIG. 1A after etching;

FIG. 2A is a cross-sectional schematic view of a portion of a disk etched to form a topography including recesses in a substrate according to an embodiment of the present invention, and FIGS. 2B–2D are cross-sectional schematic views of a disk including the portion of the disk according to FIG. 2A after filling the recesses with magnetizable material;

FIG. 3 is a perspective schematic view of a portion of a surface of a disk according to an embodiment of the present invention;

FIGS. 4A and 4B are top, plan schematic views of portions of disks according to embodiments of the present invention;

FIG. 5 is a schematic view of an information recording system and magnetic reading assembly including a suspended head for recording and reading information on a disk according to an embodiment of the present invention;

FIG. 6 is a schematic view of various waveforms imparted to the magnetic field information in accordance with the invention;

FIGS. 7A–7H are schematic representations of the different magnetic states of the features in accordance with the invention;

FIG. 8 is a schematic view of dual-axis read/write head in accordance with the invention;

FIGS. 9A and 9B are schematic views of the uni-axis component read/write heads of in accordance with the invention; and FIGS. 10A and 10B are schematic illustrations of the relative magnetization polarities of the read/write heads and the features in accordance with the invention.

DESCRIPTION OF THE PREFERRED EMBODIMENTS

A disk medium 21, as shown in FIG. 1A, comprises a substrate 23 which is non-magnetic and is in the form of, for example, a chemically etchable glass layer over a ceramic disk, or a polycarbonate disk, or other appropriate materials, such as glass, silicon, carbon, etc. The substrate 23 in FIG. 1A is coated with a thin layer of magnetizable material 25. The magnetizable material 25 is also well-known, and is in the form of, for example, a layer of NiCoCr, PtCoCr, Fe, or Co deposited on the surface 27 of the substrate 23 or over layer of chromium deposited on the surface of the substrate, chromium being understood to particularly facilitate increasing information storage density.

A pattern or mask for forming an etched, designed topography 29 to be etched in the magnetizable material 25 or the magnetizable material 25 and the substrate 23 is designed and generated. The pattern is transferred onto the magnetizable material 25 by known methods, such as by contact or projection methods. The pattern is developed onto the surface 33 of the magnetizable material 25. The developed pattern is then etched into the magnetizable material 25, as seen in FIG. 1B, or into the magnetizable material and the substrate 23, as seen in FIG. 1C, to form the topography 29 along a first surface of the disk medium 21.

As the designed topography 29 is etched into the magnetizable material 25 (and, if desired, the substrate 23) individual magnetizable features 31 separated from one another by the non-magnetic substrate are formed. Accordingly, the features 31 correspond to the designed topography 29. The features 31 may be in any desired, preferably easily reproducible, form, such as the offset and aligned squares shown in FIGS. 3 and 4A, respectively, or the hexagons shown in FIG. 4B, or in the form of circles (not shown), etc., disposed along the first surface of the disk medium 21.

The features 31 of the disk medium 21 are preferably arranged in a series of substantially circular tracks 34 (identified by dashed, annular lines on the disk 21 shown in FIG. 5) and the topography 29 preferably further includes additional, designed track identification features 35 at desired points. Alternatively, the features 31 may be disposed in a spiral pattern on disk medium 31. Annular track identification features 35 are shown in cross-section in FIGS. 1B–1C as enlarged magnetizable features, however, track identification features can be provided in any appropriate form.

According to a preferred embodiment, the pattern is used to form an ordered topography with features having precise dimensional relationships relative to one another. Spacing of features relative to one another is preferably as precise as masking and etching technology permits. In a preferred embodiment of the invention, a circular disk medium is written on or read by being rotated such that the disk medium is moved relative to a read/write head. The features formed by etching according to the pattern are preferably arranged in a circular or helical fashion. However, because of their extremely small size, small numbers of successive ones of the features will preferably appear to lie on a straight line. Such a straight line may actually be slightly curved as it forms a small segment of the circle or helix on which the features are actually disposed. It is possible that developments in read/write technology that may presently exist and with which the inventor is not familiar or that may occur in the future will permit or require reading or writing on features that are disposed in a substantially perfectly straight line. In all embodiments of the present invention, adjacent features in the read/write direction of the disk medium are preferably equally spaced relative to each other. The use of the pattern permits identical reproduction of a topography of features, with identical reproduction being limited in accuracy substantially only in terms of the limits of masking and etching technologies.

After formation of the topography 29, a layer of a material such as a protective coating 37 is preferably applied over the exposed surface 27 of the substrate 23 and the exposed surfaces 33 of the features 31 formed from the magnetizable material 25. The protective coating 37 is known, and is preferably a hard protective material such as a SiN, SiC, SiO$_2$, or C material and/or a soft protective material such as a chlorofluorocarbon (CFC) material.

FIG. 2A shows another embodiment of a substrate 23' similar to the substrate 23 of the disk medium 21 and FIGS. 2B–2D show another embodiment of a disk medium 21' including the substrate 23'. A pattern or mask for forming an etched, designed topography 29' to be etched on the surface 27' of the substrate 23' is designed and generated. The pattern is transferred onto the substrate 23' by known methods. The pattern is developed onto the surface 27' of the substrate 23'. The pattern is then etched into the substrate 23', as seen in FIG. 2A, to form a topography 29' including recesses in the surface 27' of the substrate.

Magnetizable material 25' is deposited on the surface 27' of the substrate 23' to fill (FIG. 2B), partially fill (FIG. 2C), or over-fill (FIG. 2D) the recesses with magnetizable material and form individually magnetizable features 31 ' corresponding to the designed topography 29'. The partial-fill features 31' of FIG. 2C will be referred to as holes, while the over-fill features 31' of FIG. 2D will be referred to as islands. As an example, the features 31 ' may be formed by depositing magnetizable material over the entire surface 27' of the substrate 23' and separating the features from other ones of the features by chemically etching away any magnetizable material that is deposited on the non-recessed portions of the surface 27' of the substrate. If necessary, the deposited magnetizable material 25' for forming the recessed features 31 ' is masked prior to etching. The features 31 ' are also preferably in easily reproducible forms, such as circles, squares, hexagons, etc.

The features 31' of the disk medium 21' are also preferably arranged in a series of tracks and the topography 29' preferably further includes track identification features 35' at desired points. After formation of the topography 29', a protective coating 37' is preferably applied over the exposed surface 27' of the substrate 23' and the exposed surfaces 33' of the features 31'

Information recording system 39 for use in conjunction with either one of the disk media 21 or 21' is shown in FIG. 5. The information recording system 39 is described in conjunction with the disk medium 21 by way of example. In the system 39 shown in FIG. 5, the disk medium 21 is rotated, as in conventional disk apparatuses, by a known driver 41. Information is recorded on the disk medium 21 by a magnetic head 43 which selectively magnetizes individual ones of the features 31. Each feature 31 thereby corresponds, in effect, to an individual bit of information.

As noted above, the features 31 formed from the magnetizable material 25 are preferably physically separated from one another as a result of the etching process. The nonmagnetic material of the substrate 23 surrounds the features 31 and, because the features are discrete, unlike in conventional magnetic disks, problems associated with interfering, adjacent magnetic fields are minimized. Particularly, the discrete features 31 permit reduction of the crosstalk that occurs in conventional magnetic disks that makes low magnetic head flying heights and high coercivity thin films necessary and limits magnetic disk storage capacity.

As a consequence of the physical separation of the individual features 31 by the non-magnetic material of the substrate 23, high coercivity magnetizable material 25 is less necessary in the disk medium 21 of the present invention than in conventional disks. Further, because of less interference, the need to minimize magnetic head flying heights during read/write operations is less necessary. Nonetheless, features of the present invention such as the physical separation of the individual features and the ability to control surface roughness characteristics on the disk media of the present invention through control of the etching process facilitate increasing information storage density on the disk medium. The reduced interference facilitates the use of higher coercivity magnetizable materials and the high degree of regularity of surface features that can be achieved on the disk media of the present invention facilitates lowering head flying heights. As in conventional disks, the use of such higher coercivity materials and/or lower head flying heights facilitates increasing information storage density.

With reference to FIG. 5, the magnetic head 43 of the information recording system 39 may also be used to read recorded information on the disk medium 21 in a conventional manner. As noted above, because the features 31 of the topography 29 are preferably surrounded by the non-magnetic material of the substrate 23, problems associated with crosstalk in magnetic information read/write systems are minimized.

In a system including means, such as the driver 41, for rotating the disk medium 21 at a predetermined rotational speed and utilizing a magnetic head 43, such as the magnetic information reading system and magnetic information recording system 39 shown in FIG. 5, when rotation of the disk is stopped, the magnetic head 43 generally rests on the surface 49 of the disk medium 21. Ordinarily, the magnetic head 43 is suspended relative to the disk medium by movable suspension means 59 such as a known suspension arm.

In magnetic read/write apparatuses having movable heads, such as the magnetic head 43 suspended by the suspension arm 59 of the apparatus 39 shown in FIG. 5, it is desirable to maintain a particular magnetic head 43 flying height. The etching of the magnetic material and/or the substrate to form the etched, designed topography of the disk media 21 and 21' is preferably controlled so that the exterior surfaces of the disk media are provided with a designed $R_a$ characteristic of the designed topography. As, for example, the disk medium 21 is rotated by the driver 41, aerodynamic effects at the surface 49 of the disk medium create an air bearing characteristic of the designed $R_a$. The air bearing is preferably capable of suspending the magnetic head 43 at a characteristic flying height above the surface 49 of the disk medium. Thus, the head flying height is characteristic of the designed topography 29 and control of the etching process. A designed topography of features in a disk medium for optimizing operational characteristics such as head flying heights in a magnetic information storage system is disclosed in U.S. patent application Ser. No. 07/808,867has been refiled as U.S. patent application Ser. No. 08/171,260, now U.S. Pat. No. 5,576,918, the disclosure of which is hereby incorporated by reference.

Further, where movable head devices, such as the magnetic head device shown in FIG. 5, contact the disk media 21 and 21' during starting and stopping of rotation of the disk media it is desirable to reduce transient friction events which tend to damage the disk media and the head devices. A coefficient of friction $C_f$ characteristic of the surface of the disk media, for example the surface 49 of the disk medium 21, in contact with the contacting head is preferably designed to minimize such transient friction events. The etching of the magnetic material and/or the substrate to form the etched, designed topography of the disk medium 21 is preferably controlled so that the exterior surface 49 of the disk medium in contact with a particular head surface has a designed $C_f$ characteristic of the designed topography. Like the disk medium 21, the disk medium 21' shown in FIGS. 2B–2D can be formed to achieve desired $R_a$ and $C_f$ values for optimizing head flying heights and controlling and minimizing adverse friction effects. The disk medium 21' particularly facilitates minimizing adverse transient friction events between the disk surface and contacting members such as a movable head because the surface of the disk medium can be made almost perfectly smooth. Known etching processes are capable of producing highly regular surfaces, and permit lowering head flying heights to levels limited substantially only by designed topographical features.

The designed $R_a$ and $C_f$ values are preferably obtained by controlling factors such as the size and frequency of recesses and protrusions etched to form the topography of the disk media. Such factors are preferably controlled by controlling the topography etching process. Accordingly, the features 31 on the disk medium 21 corresponding to the topography 29, shown in the embodiments of FIGS. 1B and 1C, are formed, by etching the magnetizable material 25 and, if desired, the substrate 23, to be of a desired area, height, and frequency corresponding to designed $R_a$ and $C_f$ values. Similarly, the features 31' on the disk medium 21' corresponding to the topography 29', shown in the embodiments of FIGS. 2B–2D, are formed, by etching the substrate 23' and filling the etched recesses with magnetizable material 25', to be of a desired height or depth, and a desired area and frequency corresponding to designed $R_a$ and $C_f$ values. In both instances, optimal roughness and frictional characteristics of the disk media are preferably obtained by at least lengthening or shortening the etching process. In both instances, optimal roughness and frictional characteristics may further be obtained as a function of the amount of magnetizable material deposited on the surface of the substrate, either before etching, as in the embodiments of FIGS. 1B–1C, or after etching, as in the embodiments of FIGS. 2B–2D.

In one embodiment in accordance with the invention, head 43 operates by sensing the net magnetic field in each feature 31 or 31' during the information reading process and imparting a net magnetic field to each feature in the information writing process. As an example, a non-zero net magnetic field can be assigned one logic state, while a zero net magnetic field can be assigned another logic state, thereby implementing a binary information storage and retrieval system.

FIGS. 7A–7H show schematically a series of magnetic domains 111, corresponding to the features 31 and 31' of disk media 21 and 21'. As discussed above, these domains may be in the forms of holes or islands. Each magnetic domain 111 has established therein a magnetic field 113 whose direction is indicated by the arrows in the domain. The domain 111 of FIG. 7A is unmagnetized with the magnetic field lines disposed randomly therein, resulting in a zero net magnetic field 113. In FIG. 7B, the left-right direction of the arrows of the magnetization in the drawing figure results in what will be referred to as South-North (S-N) magnetization 113. In FIG. 7C, a N-S (North-South) magnetization 113 is shown, in FIG. 7D an E-W (East-West) magnetization 113 is shown, in FIG. 7E, a W-E (West-East) magnetization 113 is shown, in FIG. 7F a SW-NE (Southwest-Northeast) magnetization 113 is shown, in FIG. 7G a SE-NW (Southeast-Northwest) magnetization 113 is shown, and in FIG. 7H a NE-SW (Northeast-Southwest) magnetization 113 is shown.

In accordance with the invention, each magnetization state 113 depicted in FIGS. 7A–7H represents a unique logic state. Accordingly, a byte of information, consisting of eight bits each assigned one of the eight possible states of FIGS. 7A–7H, can represent any of $8^8$, or 1,777,216 unique characters. By contrast, a conventional byte of the same size, mathematically confined to base 2, can represent only $2^8$, or 256 characters. Those skilled in the art will appreciate the advantages of such increased information storage density.

In order to read and write the information ascribed to each logic level of the domains 111 of the storage medium, an arrangement in accordance with the invention utilizes a pair of uni-axis component read/write heads 114 and 116 disposed perpendicularly to each other in a plane parallel to the domains 111. These heads collectively form a dual-axis read/write head 118 shown schematically in FIG. 8. Head 114 is disposed along the bitstream direction in a confronting relationship to the disk medium 21 or 21', as depicted in FIG. 9A, whereas head 116 is disposed orthogonally to the bitstream direction, as depicted in FIG. 9A. The bitstream direction is shown by arrow a and is the direction of the linear arrangement of the successive bits, or domains, as scanned during relative motion between head 118 and the magnetic storage medium 21 or 21' in the bitstream direction. Other orientations relative to the bitstream direction are also contemplated, so long as a non-parallel relative orientation of the heads is implemented. The relative scanning, or displacement along the bitstream direction a is effected using conventional means that rotates the disk medium 21 or 21', causing the features 31, 31' to sequentially pass the read/write head 118 for reading or writing information thereby. The heads 114 and 116 may occupy generally the same region, or they may be displaced along the bitstream direction so as to permit reading/writing of information in two domains 111 at the same time. Additionally, for each feature, the read operation of the two heads 114, 116 can be substantially simultaneous, or it can be offset in time so as to avoid potential magnetic interference. Similarly, the write operation of the two heads 114, 116 can also be simultaneous or temporally offset.

The information read and write operation in accordance with the invention relies on the principle governed by the equation $$M_H = \frac{1}{V} \sum M_i v_i \cos\theta_i$$

where $M_i$ and $v_i$ are the saturation magnetization and volume of the ith grain, respectively, and $\theta_i$ is the angle between the magnetization of the ith grain and the applied field direction. The sum is over all the grains in the sample volume V.

It can seen from this equation that the magnetization of each domain 111 as sensed by the heads 114 and 116 is a function of the relative angle between the heads and the direction of the magnetic field 113 in the domain. FIGS. 10A and 10B show relative magnetization polarities of the heads 114 and 116 and the magnetic fields 113 in the domains 111.

Depending on the sensitivity of the system, numerous, and in theory, infinite states, each assigned to a unique logic level, can thus be represented. Moreover, although described in terms of orientation in a plane, the magnetic fields can assume any orientation in three-dimensional space for detection by appropriately configured heads in order to increase information storage density even further. Use of "vertical" information storage and retrieval is well known in the art, wherein the information in each bit is stored vertically with respect to the read heads, rather in a plane parallel thereto, as discussed above.

It is also contemplated that each domain can be magnetized with a magnetic field having a predetermined waveform shape, such as a square wave 123 or a sawtooth 125 wave as illustrated in FIG. 6, with each waveform being representative of a unique logic state. Depending on the number of such waveforms, an information storage and retrieval system having any selected base, such as two or greater, can thus be achieved, and storage density significantly increased. DC and/or AC biasing are optionally imparted to the stored waveforms to improve signal-to-noise ratio. Additionally, the system can operate in the frequency domains, relying on for example LaPlace or other transforms to simplify information handling.

Additionally, the read/write system in accordance with the invention can be provided with an additional flux-sensitive head, such as hall effect or magnetoresistive effect elements, to detect the magnetic state of the domains 111 prior to scanning by heads 43 or 118. Such an additional element would sense the non-magnetized condition of the features 31, 31 '.

The above are exemplary modes of carrying out the invention and are not intended to be limiting. It will be apparent to those skilled in the art that modifications thereto can be made without departure from the spirit and scope of the invention as set forth in the following claims.

What is claimed is:

1. A method for storing and retrieving information on a magnetizable storage medium having a first major surface, the method comprising:
    forming individually magnetizable features on the storage medium, the features being arranged in an ordered, non-random pattern along a first, bitstream direction;
    storing information on the medium by selectively changing at least one magnetic state of the individual ones of the features, the change in the magnetic state of at least one of the features establishing a magnetic field in a direction which is transverse to the bitstream direction and which is parallel to the first major surface,
    wherein the step of storing comprises using a pair of uni-axis magnetizing heads, the axes of the pair of uni-axis magnetizing heads being oriented to be non-parallel relative to each other to establish the magnetic field in accordance with an input signal, the pair of heads operating substantially simultaneously along said bitstream direction during the storing operation.

2. The method of claim 1, further comprising the step of using the pair of uni-axis magnetization heads to read the stored information, the pair of heads operating substantially simultaneously along said bitstream direction.

3. The method of claim 1, further comprising the step of using the pair of uni-axis magnetizing heads to read the stored information, the pair of heads operating in a temporally offset manner along said bitstream direction.

4. A method for storing and retrieving information on a magnetizable storage medium having a first major surface, the method comprising:
    forming individually magnetizable features on the storage medium, the features being arranged in an ordered, non-random pattern along a first, bitstream direction;
    storing information on the medium by selectively changing at least one magnetic state of the individual ones of the features, the change in the magnetic state of at least one of the features establishing a magnetic field in a direction which is transverse to the bitstream direction and which is parallel to the first major surface,
    wherein the step of storing comprises using a pair of uni-axis magnetizing heads, the axes of the pair of uni-axis magnetizing heads being oriented to be non-parallel relative to each other, to establish the magnetic field in accordance with an input signal, the heads operating along said bitstream direction in a temporally offset manner.

5. The method of claim 4, further comprising the step of using the pair of uni-axis magnetizing heads to read the stored information, the pair of heads operating substantially simultaneously along said bitstream direction.

6. The method of claim 4, further comprising the step of using the pair of uni-axis magnetizing heads to read the stored information, the pair of heads operating in a temporally offset manner along said bitstream direction.

7. A method for storing and retrieving information on a magnetizable storage medium having a first major surface, the method comprising:
    forming individually magnetizable features on the storage medium, the features being arranged in an ordered, non-random pattern along a first, bitstream direction;
    storing information on the medium by selectively changing at least one magnetic state of the individual ones of the features, the change in the magnetic state of at least one of the features establishing a magnetic field in a direction which is transverse to the bitstream direction and which is parallel to the first major surface; and
    reading the stored information using a pair of uni-axis heads, the axes of the pair of uni-axis heads being oriented to be non-parallel relative to each other, the pair of heads operating substantially simultaneously along said bitstream direction during the reading step.

8. A method for storing and retrieving information on a magnetizable storage medium having a first major surface, the method comprising:

forming individually magnetizable features on the storage medium, the features being arranged in an ordered, non-random pattern along a first, bitstream direction;

storing information on the medium by selectively changing at least one magnetic state of the individual ones of the features, the change in the magnetic state of at least one of the features establishing a magnetic field in a direction which is transverse to the bitstream direction and which is parallel to the first major surface; and reading the stored information using a pair of uni-axis heads, the axes of the pair of uni-axis heads being oriented to be non-parallel relative to each other, the pair of heads operating substantially in a temporally offset manner along said bitstream direction during the reading step.

9. A method for storing and retrieving information on a magnetizable storage medium, the method comprising:

forming a sequence of individually magnetizable features on the storage medium, the features being arranged in an ordered, non-random pattern along a first, bitstream direction; and storing information on the medium by selectively changing a magnetic state of at least one of the individual ones of the features to thereby correspond to one of at least three distinct machine readable states each representative of a unique logic level.

10. The method of claim 9, wherein the magnetizable features each comprise one of islands and holes surrounded by non-magnetizable material.

11. The method of claim 9, wherein the step of storing comprises imparting one of a plurality of waveforms each representative of a unique logic level.

12. The method of claim 9, wherein each feature corresponds to a single, discrete bit of digital information.

13. A method for storing and retrieving information on a magnetizable storage medium, the method comprising:

forming a sequence of individually magnetizable features on the storage medium, the features being arranged in an ordered, non-random pattern along a first, bitstream direction; and storing information on the medium, by selectively changing a magnetic state of at least one of the features, using a magnetic head capable of imparting to the said at least one of the features magnetization in two distinct, non-parallel directions.

14. The method of claim 13, wherein each feature corresponds to a single, discrete bit of digital information.

15. An information storing and retrieving system comprising:

a disk having individually magnetizable features disposed in an ordered, non-random pattern along a bitstream direction on the disk;

a read/write head adapted to selectively change a magnetic state of at least one of the features, the read/write head comprising a pair of non-parallel heads disposed in a confronting relationship to the features along the bitstream direction and capable of imparting to said at least one of the features magnetization in two distinct, non-parallel directions; and a relative displacement means for causing a relative displacement between the disk and the read/write head along a bitstream direction.

16. The system of claim 15, wherein the read/write head is adapted to detect the magnetic state of the individual ones of the features.

17. The system of claim 16, wherein the pair of non-parallel heads are capable of detecting the magnetic states of two features along the bitstream direction at substantially the same time.

18. The system of claim 15, wherein the magnetic state of the individual ones of the features is changed by the read/write head to one of at least two machine readable states each representative of a discrete logic state.

19. The system of claim 15, further comprising a flux-sensitive head for detecting the magnetic state of the magnetizable features.

20. The system of claim 15, wherein the pair of non-parallel heads are disposed at a predetermined distance apart along the bitstream direction.

21. The system of claim 20, wherein the pair of non-parallel heads are capable of changing the magnetic states of two features at substantially the same time.

22. The system of claim 15, wherein each feature corresponds to a single, discrete bit of digital information.

* * * * *